Sept. 5, 1939.  T. A. LARRY ET AL  2,171,576
METHOD AND APPARATUS FOR EQUALIZING PRESSURES OF
OR PURGING, THE FLUID CONTENTS OF A CONDUIT
Filed Nov. 19, 1936   2 Sheets-Sheet 1

Inventors
Timothy H. Larry,
Earl E. Cline,
By Cushman, Darby Cushman
Attorneys

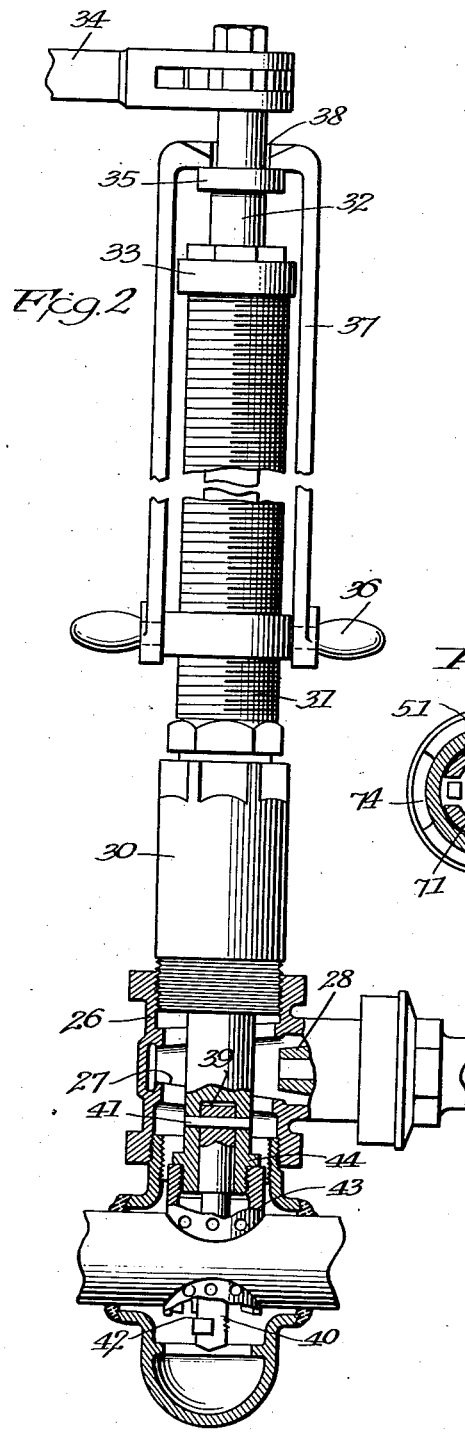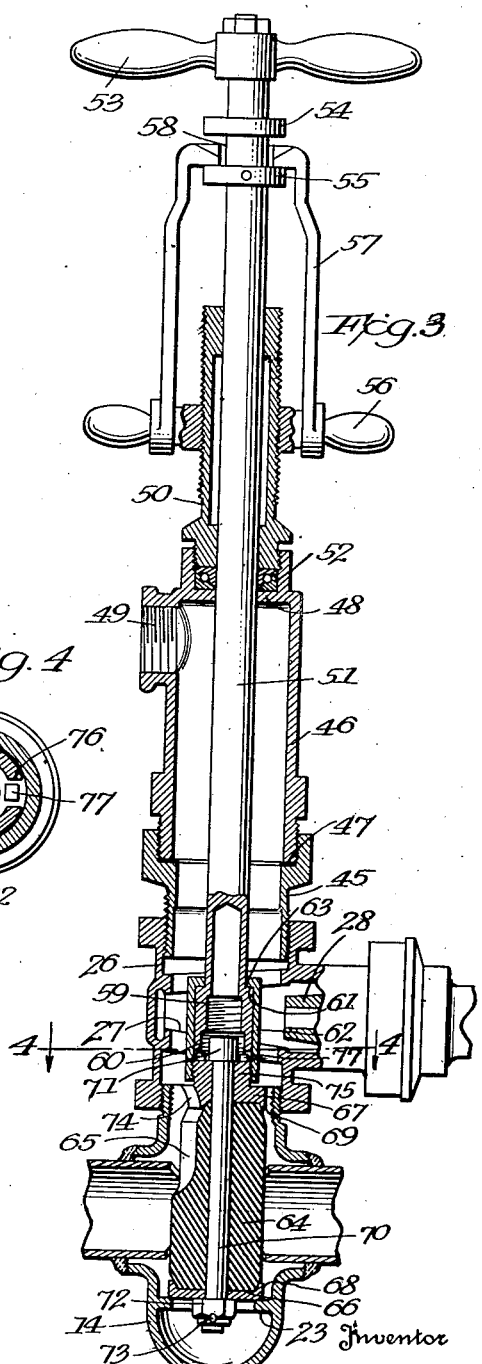

Patented Sept. 5, 1939

2,171,576

UNITED STATES PATENT OFFICE 2,171,576

METHOD AND APPARATUS FOR EQUALIZING PRESSURES OF, OR PURGING, THE FLUID CONTENTS OF A CONDUIT

Timothy A. Larry and Earl E. Cline, Decatur, Ill.; said Cline assignor to Mueller Co., Decatur, Ill., a corporation of Illinois Application November 19, 1936, Serial No. 111,744

5 Claims. (Cl. 137—73)

This invention relates to methods and apparatus for use in the maintenance and repair of pipe line systems such as are generally employed for the distribution of gas or other fluids.

In the maintenance and repair of such systems it is frequently necessary to replace and repair a section of a fluid containing conduit and it is customary to temporarily isolate such a section from the remainder of the conduit during such replacement or repair.

It will be apparent that where a section of a conduit, containing a fluid under high pressure, is removed, a large amount of fluid will escape during the cutting operation. One of the objects of this invention is to provide a method and apparatus for permitting the fluid to flow out of the section and to conduct the fluid to a point relatively remote from the conduit where it may be released in a controlled manner.

A further object of the invention is to provide a method and apparatus for effecting the complete removal of any combustible or noxious gases from the section which is to be removed.

It will be understood, that after the section has been replaced or repaired, air will have accumulated within the section. After flow is restored through the section the air may travel through the conduit as a bubble, and in any event it will dilute the contents of the conduit. A further and important object of this invention is to provide a method and apparatus whereby the air may be purged from the section which has been replaced or repaired, and whereby a fluid, similar to that which is contained in the remainder of the conduit may be substituted for the air.

Other objects of the invention will be apparent from the accompanying description and drawings.

Referring to the drawings:

Figure 2 is a view, partly in section of one form of apparatus which may be used to establish an opening in the conduit.

Figure 3 is a view, partly in section, of one form of apparatus adapted to provide communication with the interior of the section which is to be replaced or repaired and to prevent the flow of fluid into the section from the conduit.

Figure 4 is a horizontal section taken on the line 4—4 of Figure 3.

Figure 1:
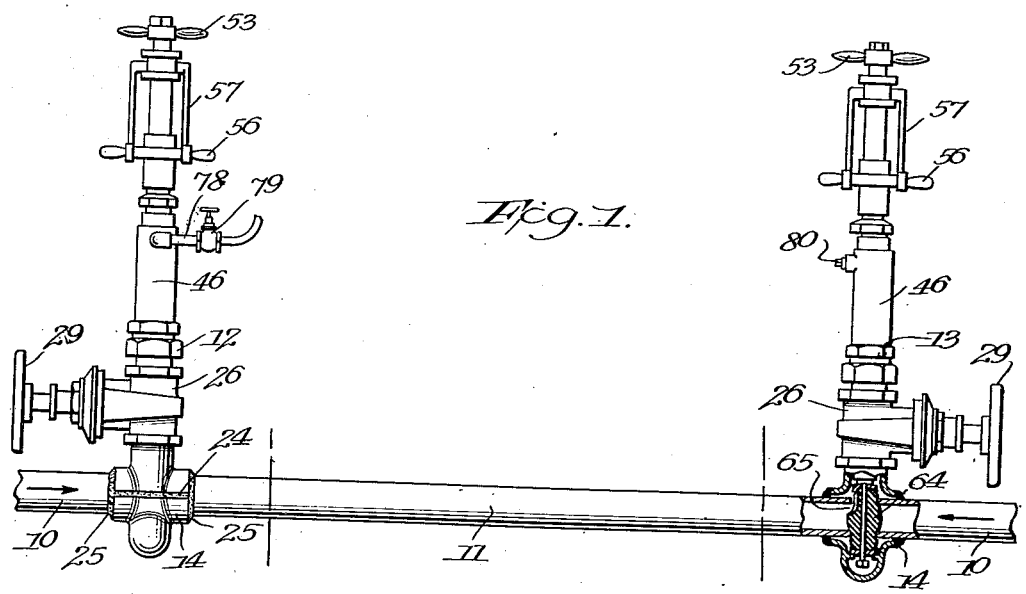
Figure 1 is a vertical elevation, partly in section, showing the apparatus of this invention applied to a conduit.

Referring more particularly to the drawings, Figure 1 shows apparatus, which may be used in practicing this invention, applied to a pipe line or conduit 10, it being assumed that the pipe line is tied in at both ends to sources of fluid under pressure, and that the intermediate section 11 is to be removed and replaced by a new section. Since the conduit is connected to a source of fluid at either side of the section 11, the arrows indicating the direction in which the fluid would flow if an outlet were afforded in the section, it will be understood that the section 11 may be isolated from the remainder of the conduit without interrupting service to consumers whose service pipes are connected to the conduit at either side of the section.

As shown in Figure 1, shut-off apparatus, generally designated at 12 and 13, are attached to the conduit 10 at either side of the section 11 for the purpose of isolating the section 11 from the remainder of the conduit. As illustrating one form of apparatus which may be used in carrying out this invention, the detail construction of the two shut-off apparatus 12 and 13, which are generally similar, and the preferred manner of attaching the shut-off apparatus to the conduit, will be described below.

The apparatus includes a fitting generally designated by the numeral 14 which may be formed as an integral casting, and thereafter divided into two parts, by cutting along the two sides. The fitting may consist of a substantially cylindrical or tubular body, having an opening at its upper end and closed at its lower end. The upper end, as shown in Figure 3, is preferably threaded exteriorly for the attachment of other parts of the shut-off apparatus.

The fitting is provided with aligned lateral openings, which are adapted to receive a pipe, and the lower cylindrical portion is provided interiorly with a circumferential ledge or projection 23 which is adapted to serve as an abutment to limit the inward or downward movement of the shut-off member which, as will be described, is inserted through the open end of the fitting.

As shown in Figure 1, a fitting 14 is secured to the conduit at either side of the section 11 which is to be removed. After the fitting is cut transversely and separated into two parts the upper and the lower parts are brought together around the pipe and welded to each other by transverse welds 24, 24 and the fitting is then welded to the pipe by the end welds 25, 25.

After the fittings have been welded to the conduit at spaced points, on either side of the section 11, a valve body 26 having a tapered valve seat 27 and provided with a gate valve 28 operable by a handle 29, as shown in Figures 1 and 2, is threaded on the upper end of each fitting.

An adapter sleeve 30 is threaded into the upper end of each valve body 26, as shown in Figure 2, and a device or machine, generally similar to pipe drilling machines of well known construction and including the feed sleeve 31, is positioned upon each adapter sleeve 30 by means of screw threaded engagement between the feed sleeve 31 and the upper end of the adapter sleeve 30.

Bar 32 is slidably and rotatably mounted within the feed sleeve 31, a fluid-tight joint being maintained between the two by means of conventional packing (not shown) secured upon the upper end of the feed sleeve 31 by an internally flanged collar 33. The bar 32 is provided at its upper end with an operating handle 34 having a conventional ratchet device thereon to permit the bar to be rotated with a ratchet effect. A collar 35 is fixed on the upper portion of the bar 32 beneath the handle 34 and, in order that the bar 32 may be fed downwardly in the usual manner, a feed screw 36 is threaded upon the feed sleeve 31 and may be connected to the bar 32 by means of a yoke 37 pivoted upon the feed screw and having its head portion slotted as at 38 so that it may be moved into engagement with the upper surface of the collar 35 as shown in Figure 2.

The lower end of the bar 32 is provided with a central bore 39 for reception of a pilot drill 40, which is retained therein by means of a pin 41 passing through suitable apertures in the bar and pilot drill. The lower end of the pilot drill is enlarged to provide the shoulder 42 thereon.

The lower end of the bar 32 is externally threaded for engagement with the internal threads of a shell cutter 43, and is provided with a flange 44 positioned above the screw threads, against which the upper end of the shell cutter abuts when the latter is tightly screwed onto the bar.

In order to drill through the pipe 10, within the fitting 14, the bar 32 is moved downwardly, with the gate valve 28 open, until the pilot drill 40 engages the conduit. The yoke 37 is then swung into engagement with the bar 32, its slotted head portion positioned above the collar 35 of the bar, and the drilling accomplished by rotating the bar 32 by means of handle 34 and applying downward pressure by rotating the feed screw 36 to the right.

The diameter of the shell cutter 43 is preferably slightly greater than the internal diameter of the conduit 10 in order that substantially the entire cross section of the pipe will be removed as shown in Figures 2 and 3. It will be understood that the pilot drill precedes the shell cutter through the conduit and acts as a guide for the shell cutter. The coupons, which are cut out of the pipe by the shell cutter, will be caught on the shoulder 42 at the lower end of the pilot drill 40 and will be removed from the fitting when the drill is withdrawn.

Owing to the fact that the drilling device is completely enclosed, no fluid will escape during the drilling operation.

When the drilling is completed, the yoke 37 is disengaged from the bar 32 and the latter is then raised to withdraw the shell cutter and pilot drill into the adapter 30. The gate valve 28 is now operated to closed position and the drilling apparatus 36 is removed by unscrewing the adapter 30 from the valve body 26.

Although, as described above, a drilling apparatus may be attached to each valve body 26 and the two openings established simultaneously, it may, in some instances, be preferable to use one drilling apparatus which is attached successively to the valve bodies 26 on the respective fitting.

Shut-off apparatus 12 and 13 are now secured to the upper end of the valve bodies 26, as shown in Figure 1.

Referring more particularly to Figure 3, each shut-off apparatus includes an adapter 45, externally screw threaded at its lower end for attachment to the upper end of the valve body 26. The adapter, which may be made in various sizes, is preferably provided at its upper end with internal screw threads for the attachment of a substantially cylindrical chamber 46.

The lower open end of the chamber 46 is externally screw threaded for engagement with internal screw threads at the upper end of the adapter 45, an annular gasket 47 being inserted between the two to provide a fluid-tight joint. The chamber 46 is provided with an apertured top wall 48 and the side wall of the chamber is provided with an internally threaded opening 49. The side wall of the chamber 46 extends above the top wall 48 and is provided, at its upper extremity, with internal threads for the attachment of a feed sleeve 50.

A bar 51 is slidably and rotatably mounted within the feed sleeve 50 and within the centrally apertured top wall 48 of the chamber 46, a tight joint being maintained around the lower end of the feed sleeve, by means of a conventional packing 52 located between the feed sleeve 50 and the upper wall 48 of the chamber 46.

The bar 51 is provided at its upper end with an operating handle 53. Spaced collars 54 and 55 are fixed on the upper portion of the bar 51 and in order that the bar 51 may be forced upwardly or downwardly, a feed screw 56 is threaded on the feed sleeve 50 and may be connected with the bar 51 by means of a yoke 57 pivoted upon the feed screw 56 and having its head portion slotted as at 58 so that it may be swung into engagement with the bar 51 between the collars 54 and 55.

The lower end of the bar 51 is provided with a socket 59, and a lower counter-bored socket 60 internally threaded with right hand threads. The lower end of the bar 51 is slightly enlarged to provide a shoulder 61 for the retention of a sleeve 62, the upper end of which is internally flanged at 63. The sleeve 62, which is adapted to be slipped on over the top of the bar 51, during the assembly thereof and before the handle 53 and collars 54 and 55 are attached, extends below the lower extremity of the bar 51 and is provided at its lower end with internal screw threads for the attachment of a shut off means to be described below.

The shut-off means, which is attached to the lower end of the bar 51, may include a substantially cylindrical member 64, preferably made of some resilient material such as rubber and having a diameter which is preferably slightly smaller than the diameter of the above mentioned shell cutter. The member 64 is partially cut away at one side as is shown at 65, and the cut away portion preferably extends from a point approximately half-way down its side upwardly and inwardly to the top of the member. Disc-like caps 66 and 67, which are preferably inwardly flanged, as shown at 68 and 69, are positioned above and below the member 64. The caps 66 and 67 and the member 64 are centrally apertured for the reception of a rod 70 on which they are slidably mounted. The rod 70 is provided at its upper end with a slightly enlarged head 71 and its lower end is threaded for the reception of a nut 72 whereby the member 64 may be clamped between the upper and lower caps 66 and 67 when the nut 72 is tightened. The nut 72 is preferably provided with slots upon its undersurface and the rod 70 is apertured at its lower end for the reception of a conventional locking pin 73. The upper cap 67 is cut away at one side as at 74 to conform with the cut away portion 65 of the member 64, and the flange 69 follows the contour of the cut away portion, in order to prevent rotation of the member 64 with respect to the cap 67 after the parts are assembled. The cap 67 is provided with a central and upwardly extending cylindrical portion 75 which is externally threaded for attachment to the internally threaded sleeve 62.

When the cylindrical portion 75 of the cap 67 is threaded into the sleeve 62 it will abut the lower end of the bar 51 and it will, therefore, be apparent that downward pressure on the bar 51 will be directly transmitted to the cap 67. It will also be apparent that upward movement of the bar 51 will raise the cap 67 by reason of the fact that the internally flanged sleeve 62 engages the lower enlarged end of the bar 51 and also engages the upwardly extending central portion 75 of the cap 67.

The lower extremity of the bar 51, which forms the socket 60, is provided with slots 76, 76 adapted to receive lugs 77, 77 positioned on the upper surface of the cylindrical portion 75, as shown in Figure 4, whereby relative rotation of the cap 67 and consequently the member 64, with respect to the bar 51, will be prevented.

In carrying out the method of the present invention, a shut-off apparatus, such as is above described, is connected to each of the valve bodies 26 on the respective fittings 14, it being understood that the fittings are located at either side of the section 11, which is to be isolated from the conduit 10, as shown in Figure 1.

As above described, each of the chambers 46, of the shut-off apparatus, is provided with an aperture 49 in its lateral wall. A pipe 78 provided with a valve 79, is connected to the shut-off apparatus 12 (Figure 1) at the aperture 49 and a plug 80 is threaded into the aperture 49 of the shut-off apparatus 13.

When the shut-off apparatus is attached to the upper end of the valve body 26 the member 64 will be withdrawn into a position within the chamber 46. This withdrawal is accomplished by disengaging the yoke 57 from the bar 51 and pulling up on the handle 53. The diameter of the member 64 is substantially less than the internal diameter of the chamber 46, the adapter and the valve body, so that when the member 64 is in raised position it will not prevent the flow of fluid from the conduit 10 into the upper part of the chamber 46.

After a shut-off apparatus has been attached to each of the valve bodies 26 and after the valve 79 on the shut-off apparatus 12 has been closed and after the plug 80 has been inserted in the shut-off apparatus 13, the valves 28 may be moved to open position.

By turning the handles 53 of the respective shut-off apparatus, members 64 are rotated until the cut away portions 65 are aligned with the axis of the conduit 10 and face toward each other. The bar 51 of the shut-off apparatus 13 is then moved downwardly, by pushing down on handle 53 until the member 64 is in the position shown in Figure 3, the downward movement being arrested when the lower cap 66 contacts the inwardly projecting abutment 23 of the fitting 14.

The yoke 57 of the shut-off apparatus 13 is now swung to upright position engaging the bar 51 between the collars 54 and 55 as shown in Figure 3, and feed screw 56 is turned to the right to apply downward pressure, through the collar 62 and bar 51 to the cap 67.

The cap 66 at the lower end of the member 64 is held against downward movement by the abutment 23 of the fitting 14, and, since the member 64 is made of resilient material, the downward pressure on the cap 67 will cause the member 64 to expand laterally as shown in Figure 1.

Upon expansion of the member 64, it will be forced into contact with the adjacent walls of the conduit 10, as shown in Figure 1, and act as a valve to prevent flow of fluid from the conduit 10 into one end of the section 11.

The member 64 of the shut-off apparatus 12 having been adjusted as above described so that its cut away portion 65 faces toward the shut-off apparatus 13, it is now compressed in the same manner as described in connection with the shut-off apparatus 13. As a result, the flow of fluid from the conduit 10 into the other end of section 11 will be shut off and the section 11 will thus be isolated from the conduit 10.

It will be apparent that fluid which may be under high pressure will be trapped within section 11. Since this fluid may be highly combustible or noxious, it is frequently desirable to remove it from the section 11 and conduct it to a relatively remote point where it may be safely liberated, particularly so where the operations on the section 11 are to be carried out in a trench and where acetylene torches are to be used in cutting the section 11. A relatively remote point may be considered to be about two feet or more from the main conduit. This may frequently be accomplished by merely opening the valve 79 and permitting the fluid to flow out of the section 11 through the cut away portion 65 (shut-off apparatus 12) and thence through the chamber 46 and pipe 78, which latter may extend upwardly for a considerable distance. Where it is necessary to remove all traces of the original gaseous contents of the section 11, or where the section contains a liquid, the plug 80 may be removed from the shut-off apparatus 13 and a source of compressed air (not shown) may be attached at the aperture 49. Compressed air is then allowed to enter the chamber 46 and will pass downwardly into the section 11 through the cut away portion 65 of the member 64 and then through the section 11 and out through the pipe 78 connected to the shut-off apparatus 12, thus completely purging section 11.

After the replacement or repair of section 11 is completed and it is desired to restore flow therethrough, the members 64 of the respective shut-off apparatus may be removed, as will be hereinafter described, but in order that the contents of the conduit 10 shall not be diluted with the air now contained in the section 11, the latter is first purged in the following manner.

By turning the handle 56 to the left, downward pressure on the member 64 of the shut-off apparatus 13 may be relaxed. Thereupon the member 64 will assume its original cylindrical form and fluid will be allowed to pass from the conduit 10 into the section 11. If, at the same time, the valve 79 is opened, the fluid coming from the conduit 10 into the section 11 will force air contained in the latter out through the shut-off apparatus 12 and pipe 78. When the fluid from the conduit 10 reaches the outlet of the pipe 78, in its original concentration, the valve 79 will be closed and the shut-off apparatus may be removed as will be described hereinafter.

In actual practice a certain amount of air may remain in the chamber 46 of the shut-off apparatus 13 unless the flow of fluid through the section 11 is permitted for a considerable period, but since the valves 28 in the valve bodies 26 are subsequently closed, as will be explained, this air will not mix to any extent with the contents of the conduit 10. However, if it is necessary to remove the air from the chamber 46 of the shut-off apparatus 13 in an expeditious manner, the plug 80 may be removed while the fluid from the conduit 10 is being permitted to enter the section 11.

In some cases the pressure in the conduit 10 may be much greater than the pressure in the section 11 and if the material of member 64 is not sufficiently resilient to return to its original cylindrical shape, flow may be established into the section 11 by turning the handle 53 through an angle of 90°. The cut away portion 65 will then provide communication between the conduit 10 and the section 11, and no difficulty will be experienced in raising the member 64 after pressures have been thus equalized.

Although the above method of purging air from the section 11 is preferred, it may in some cases be desirable to connect a source of fluid, which fluid is similar to that contained in the conduit 10, to the aperture 49 of one of the shut-off apparatus and force the fluid through the section 11 and out through the aperture 49 of the other shut-off apparatus.

When the section 11 has been replaced or repaired and when the air contained therein has been replaced by fluid from the conduit 10, as above explained, the shut-off apparatus 12 and 13 and the valve bodies 26 may be removed from the fitting 14 and the upper openings of the latter may be closed without substantial loss of fluid.

The feed screws 56 having been turned to the left to relax pressure on the members 64, the yokes 57 may be disengaged from the bars 51, and the members 64 are drawn up into the chambers 46 by pulling up on the handles 53. The gate valves 28 are then closed, to prevent further flow of fluid into the chambers 46 and the latter may be unscrewed and removed from the adapters 45.

If it is not convenient or desirable to utilize the valve bodies 26 and the valves 28 as closures for the open ends of the fittings 14 for an indefinite period of time, a plug like closure may be inserted in the open end of each fitting as described in our copending application Serial No. 100,780, filed September 14, 1936.

Matter described but not claimed herein is claimed in our copending applications Serial No. 100,782, filed September 14, 1936; and Serial No. 122,248, filed January 25, 1937; and in the copending application of Timothy Allan Larry, Earl E. Cline, and Orville J. Hawkins, Serial No. 128,284, filed February 27, 1937.

Since the above apparatus and methods may be modified without departing from the scope of the invention, it is intended that all matter contained in the above description and shown in the accompanying drawings, shall be regarded as merely illustrative.

We claim:

1. The method of isolating a section of a fluid containing conduit, whereby the section may be replaced or repaired, and subsequently re-establishing communication between the section and the remainder of the conduit without substantial dilution of the fluid in the conduit, which comprises establishing openings at either side of the section, inserting valve members in the conduit through the openings to prevent flow of fluid into the section, and after the section has been replaced or repaired, displacing the air from the section, and from the conduit, by permitting the fluid contents of the conduit to enter the section.

2. The method of isolating a section of a fluid containing conduit, whereby the section may be replaced or repaired, and subsequently re-establishing communication between the section and the remainder of the conduit without substantial dilution of the fluid in the conduit, which comprises establishing openings at either side of the section, inserting valve members in the conduit through the openings to prevent flow of fluid into the section, and after the section has been replaced or repaired, providing an outlet through one of said openings for the air which is trapped in the section and displacing the air from the section, and from the conduit, by permitting the fluid contents of the conduit to enter the section.

3. The method of isolating a section of a fluid containing conduit, whereby the section may be replaced or repaired, and subsequently re-establishing communication between the section and the remainder of the conduit without substantial dilution of the fluid in the conduit, which comprises establishing openings at either side of the section, inserting valve members in the conduit through the openings to prevent flow of fluid into the section, and after the section has been replaced or repaired, displacing the air from the section through one of said openings by varying the relationship of the valve member which was inserted in the other opening so as to permit the fluid contents of the conduit to enter the section.

4. The method of isolating a section of a fluid containing conduit, whereby the section may be replaced or repaired, and subsequently re-establishing communication between the section and the remainder of the conduit without substantial dilution of the fluid in the conduit, which comprises establishing openings at either side of the section, inserting valve members in the conduit through the openings to prevent flow of fluid into the section, and after the section has been replaced or repaired, providing an outlet for the air which is trapped in the section and displacing the air from the section, and from the conduit, by actuating one of the said valve members so as to provide a flow passage from the conduit into the section.

5. The method of isolating a section of a fluid containing conduit, whereby the section may be replaced or repaired, and subsequently re-establishing communication between the section and the remainder of the conduit without substantial dilution of the fluid in the conduit, which comprises establishing openings at either side of the section, inserting valve members in the conduit through the openings to prevent flow of fluid into the section, and after the section has been replaced or repaired, forcing the air in the section to flow out through one of the openings by injecting a fluid, similar to the fluid contained in the remainder of the conduit, through the other opening.

TIMOTHY A. LARRY.
EARL E. CLINE.